United States Patent
Strater et al.

(10) Patent No.: US 8,018,872 B2
(45) Date of Patent: Sep. 13, 2011

(54) METHOD AND APPARATUS FOR MITIGATING LAYER-2 LOOPING IN HOME NETWORKING APPLICATIONS

(75) Inventors: Jay W. Strater, Jamison, PA (US); Thomas L. Du Breuil, Ivyland, PA (US); Gerald R. Johnson, Cataumet, MA (US)

(73) Assignee: General Instrument Corporation, Horsham, PA (US)

( * ) Notice: Subject to any disclaimer, the term of this patent is extended or adjusted under 35 U.S.C. 154(b) by 251 days.

(21) Appl. No.: 11/829,134

(22) Filed: Jul. 27, 2007

(65) Prior Publication Data
US 2009/0028180 A1    Jan. 29, 2009

(51) Int. Cl.
- *G01R 31/08* (2006.01)
- *H04L 12/28* (2006.01)
- *H04M 3/00* (2006.01)

(52) U.S. Cl. ............... 370/254; 370/252; 455/418

(58) Field of Classification Search ........... 370/252, 370/254; 455/418
See application file for complete search history.

(56) References Cited

U.S. PATENT DOCUMENTS

| | | | |
|---|---|---|---|
| 2003/0236904 A1 | 12/2003 | Walpole et al. | |
| 2005/0220036 A1* | 10/2005 | Sugitani et al. | 370/252 |
| 2006/0013141 A1* | 1/2006 | Mutoh et al. | 370/241 |
| 2006/0084417 A1* | 4/2006 | Melpignano et al. | 455/418 |
| 2007/0014232 A1* | 1/2007 | Yasuie et al. | 370/216 |
| 2008/0080398 A1* | 4/2008 | Yasuie et al. | 370/254 |

OTHER PUBLICATIONS

PCT International Search Report & Written Opinion for PCT/US2008/070815. Dated Oct. 7, 2008.

* cited by examiner

*Primary Examiner* — Ricky Ngo
*Assistant Examiner* — Paul Masur
(74) *Attorney, Agent, or Firm* — Larry T. Cullen

(57) ABSTRACT

Embodiments of the invention generally provide a method and apparatus for mitigating layer-2 loops in home networking applications. One embodiment of a method for mitigating layer-2 loops in a network includes detecting a loop between a first terminal in the network and a second terminal in the network, and deactivating at least one active home networking interface at the first terminal.

14 Claims, 3 Drawing Sheets

METHOD AND APPARATUS FOR MITIGATING LAYER-2 LOOPING IN HOME NETWORKING APPLICATIONS

FIELD OF THE INVENTION

The present invention generally relates to home networking applications, and more particularly relates to multiple systems operator (MSO) and telecom set top boxes having multiple bridged home networking interfaces.

BACKGROUND OF THE INVENTION

Operator internet protocol (IP)-enabled set top box (STB) solutions are moving to provide whole-home IP-STB solutions. In these solutions, hub STBs are typically expected to have multiple bridged home networking interfaces. Multiple bridged interfaces provide additional communications options, including bridging of traffic between interfaces for client STBs when needed.

FIG. 1, for example, is a block diagram illustrating one embodiment of a home network 100. The home network 100 may be configured, for example, to provide cable, off-air and Internet-based services to a home user. The home network 100 includes a plurality of terminals 102, 104 and 106 that share content via a plurality of physical (e.g., Ethernet) links 108 and logical (e.g., HomePlug AV (HPAV) or Multimedia over Coax Alliance (MoCA)) links $110_1$-$110_n$ (hereinafter collectively referred to as "logical links 110"). The terminals include one or more home routers 102, one or more hubs $104_1$-$104_n$ (hereinafter referred to as "hubs 104") and one or more clients 106. Embodiments of hubs 104 may include, for example, tuners, off-air and cable interfaces and/or hard disks for receiving off-air and cable television, digital video recorder (DVR) and Internet content services. Embodiments of clients 106 may be configured as thin clients that receive streaming content from hubs 104. In addition, hubs 104 may stream content to each other. Other embodiments of clients 106 may contain tuners for off-air and/or cable input for streaming received content to a DVR in a hub 104 and receiving the streamed content back for "trick play" service.

With hubs that contain multiple home networking interfaces, it is increasingly likely that a user will create problematic home networking architectures (at or after installation) in which more than one active communication link exists between a hub and another device. For example, in FIG. 1, two links (i.e., 108 and $110_1$) exist between the router 102 and the hub $104_1$. If the other device to which the hub is linked is a home router, a switch or another hub, a layer-2 loop can form (wherein packets cycle repeatedly through a constant series of terminals), resulting in degraded performance of the home network due to, for example, inefficient use of resources, flooding of the network with redundant information, wasted bandwidth, and the like. This happens because layer-2 bridges/switches used in home networks (such as envisioned for STB hubs) are simple learning bridges that forward received data frames (layer-2 packets) with broadcast-destination addresses out all interfaces other than the one from which a broadcast data frame is received.

In the example of FIG. 1, layer-2 looping will occur after transmission of a broadcast frame (e.g., Dynamic Host Configuration Protocol (DHCP) discover, Address Resolution Protocol (ARP) request, Universal Plug and Play (UPnP) or Simple Service Discovery (SSDP) search request, presence announcement) from the home router 102 or hub $104_1$. Those skilled in the art will appreciate that looping can occur in other architectural configurations and between other combinations of terminals, and the architecture illustrated in FIG. 1 is merely one illustrative example.

One method for mitigating layer-2 looping involves adding Institute of Electrical and Electronics Engineers (IEEE) 802.1d standard spanning tree functionality to a hub STB bridge. However, this would only prevent frame looping if the home router's local area network (LAN)-side switch also supported IEEE 802.1d spanning trees, and no such home routers or plans for such home routers are known at this time.

Therefore, there is a need in the art for a method and apparatus for mitigating layer-2 looping in home networking applications that does not rely on IEEE 802.1d spanning tree functionality.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Embodiments of the invention generally provide a method and apparatus for mitigating layer-2 looping in home networking applications. In one embodiment, an automated method for execution, for example, at a hub STB, substantially ensures that any loops occurring in a home network are detected and eliminated in a timely manner, thereby improving performance of the home network.

Figure 1:
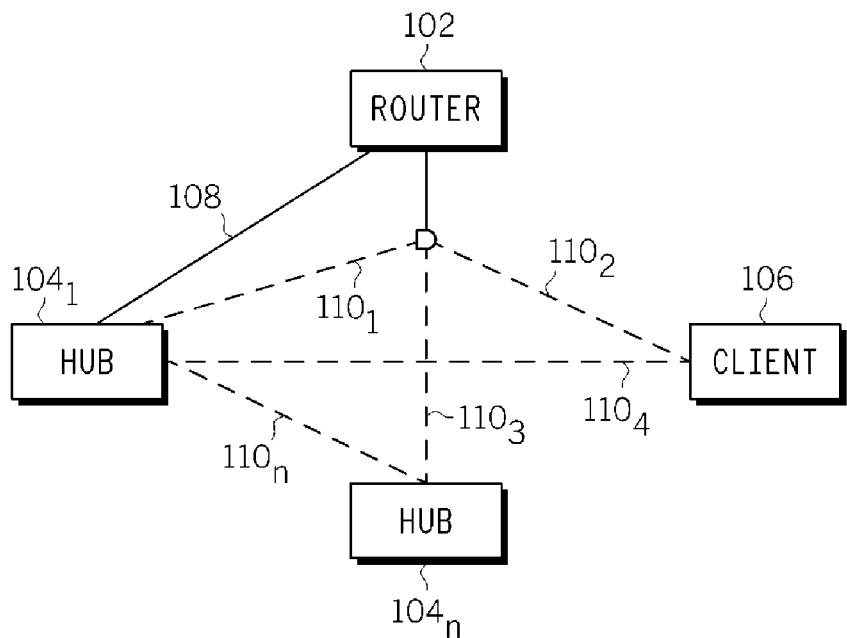
FIG. 1 is a block diagram illustrating one embodiment of a home network.
Figure 2:
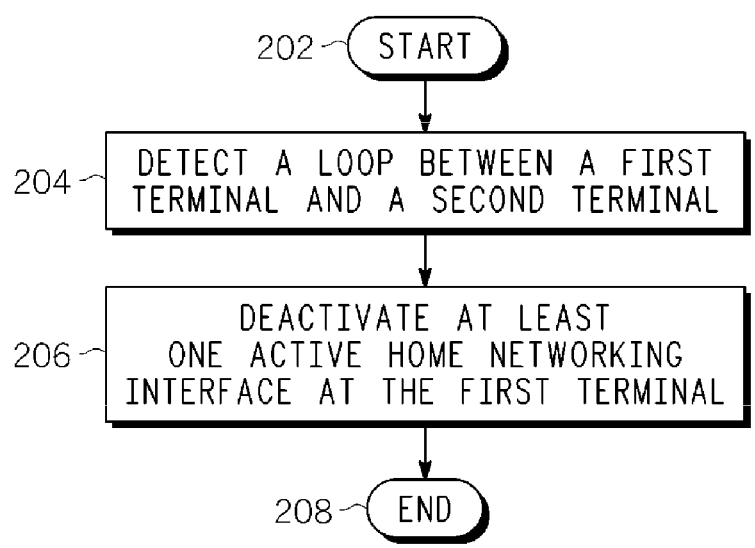
FIG. 2 is a flow diagram illustrating one embodiment of a method for mitigating layer-2 looping.

FIG. 2 is a flow diagram illustrating one embodiment of a method 200 for mitigating layer-2 looping. The method 200 may be implemented, for example, at an STB hub having multiple home networking interfaces.

The method 200 is initialized at step 202 and proceeds to step 204, where the method 200 detects a loop between a first terminal (e.g., a hub) and a second terminal (e.g., a home router, a switch or another hub) in a home network.

In step 206, the method 200 deactivates at least one active home networking interface at the first terminal. The deactivated home networking interface(s) connects the first terminal to the second terminal. Thus, in essence, in step 206, the method 200 severs at least one of the connections between the first terminal and the second terminal by deactivating the necessary number of home networking interfaces at the first terminal. The method 200 then terminates in step 208.

Figure 3:
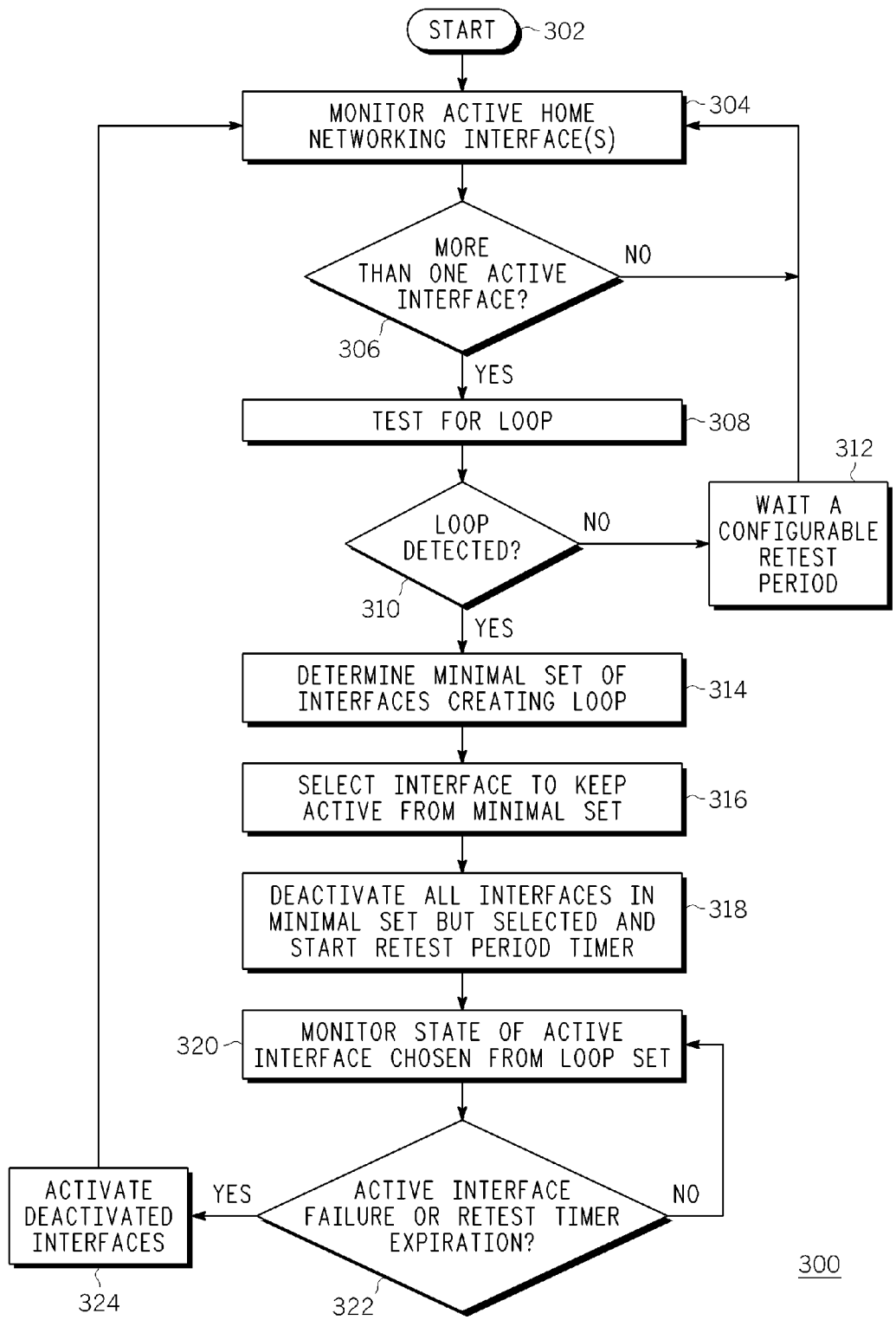
FIG. 3 is a flow diagram illustrating a more detailed embodiment of a method for mitigating layer-2 looping.

FIG. 3 is a flow diagram illustrating a more detailed embodiment of a method 300 for mitigating layer-2 looping. Like the method 200, the method 300 may be implemented, for example, at a STB hub having multiple home networking interfaces. The method 300 provides additional detail beyond the high-level technique described with reference to FIG. 2.

The method 300 is initialized at step 302 and proceeds to step 304, where the method 300 monitors any active home networking interfaces at the hub in which the method 300 is implemented. In step 306, the method 300 determines whether more than one home networking interface is active.

If the method 300 concludes in step 306 that only one home networking interface is active, the method 300 returns to step 304 to continue to monitor for a change in the number of active home networking interfaces.

Alternatively, if the method 300 concludes in step 306 that more than one home networking interface is active, the method 300 proceeds to step 308 and tests for a loop. One embodiment of a method for testing for loops is discussed in greater detail with reference to FIG. 4.

In step 310, the method 300 determines whether a loop has been detected. If the method 300 concludes in step 310 that there are no loops, the method 300 proceeds to step 312 and waits a configurable period of time before returning to step 304 and continuing to monitor the active home networking interface(s). In one embodiment, the configurable period of time is chosen such that the method 300 iterates frequently enough to address loops in a timely manner, but not so frequently that service to the network is significantly disrupted. In one embodiment, the configurable period of time is factory configured to a default value or remotely configured (e.g., by a remote operator). This effectively results in periodic testing for loops when more than one home networking interface is active.

Alternatively, if the method 300 concludes in step 310 that there is a loop, the method 300 proceeds to step 314 and determines the minimal set of home networking interfaces creating the loop. That is, the method 300 determines which of the active home networking interfaces are actually creating the loop. Such a determination is needed if one is to allow home networking interfaces that are not involved in a loop to continue functioning; this is an important feature if these home networking interfaces are the sole means of communication with certain home networking devices. There are many ways in which the minimal set of home networking interfaces can be determined. For example, in one embodiment, each pairing of home networking interfaces is individually tested, and any home networking interfaces involved in a pairing that creates a loop is a candidate for the minimal set. Thus, for instance, if home networking interfaces A, B and C are active, the combinations of A/B, A/C and B/C must be tested. Loops are formed when traffic leaves, say, home networking interface A and arrives back at home networking interface B and/or home networking interface C. The loops may occur between the hub STB conducting the testing and a first home router directly, between the hub STB and a second hub STB directly, or between the hub STB and the first home router or second hub STB indirectly (i.e., through second home router or third hub STB). Thus, for instance, if the A/C combination tests positive for a loop, then home networking interface A and home networking interface C are included in the minimal set.

In step 316, the method 300 selects one of the active home networking interfaces from the minimal set to remain active. Thus, by default, this selection also indicates which of the active home networking interfaces should be deactivated. If only two home networking interfaces are in the minimal set, only one of the home networking interfaces in the minimal set need be deactivated. However, if the number, n, of active home networking interfaces in the minimal set is more than two, n-1 home networking interfaces in the minimal set must be deactivated.

Selection of the home networking interface that will remain active may be made in accordance with any one or more of a number of criteria. In one embodiment, the selection of the home networking interface that will remain active is made in accordance with preconfigured interface priorities (determined, for example, in accordance with capacity, reliability or Quality of Service (QoS) considerations). As an example, preference may be given to home networking interfaces with embedded, advanced wireless home networking technology, starting with HPAV, then MoCA, and followed by Ethernet. Such prioritization would make sense if HPAV were considered to be the most likely interface to exist at the home router with the best QoS for AV streaming purposes. This prioritization would also make sense if Category 5 (CAT5) wiring from an Ethernet interface and with adequate QoS through home routers/switches was considered unusual.

In another embodiment, the selection of the home networking interface that will remain active is made in accordance with performance testing on an interface-by-interface basis. This embodiment will lead to better home networking interface selections than prioritization, particularly when there are sizable performance differences in the home networking technologies associated with the home networking interfaces. However, this embodiment is also complex and potentially disruptive. For example, embodiments of this approach require that the hub disable all but one home networking interface during testing and generate heavy bursts of traffic aimed at a client (if present), a PC in the home and/or a service platform (SP) on the Internet (if present). Communication with the client, the PC and the SP is typically required. One particular embodiment of a method for performance testing that may be implemented in order to select a home networking interface is described in further detail in U.S. patent application Ser. No. 11,829,131, filed Jul. 27, 2007, which is herein incorporated by reference in its entirety.

Once the method 300 has selected one of the active home networking interfaces to remain active in step 316, the method 300 proceeds to step 318 and deactivates all of the active home networking interfaces in the minimal set discovered in step 314, except for the home networking interface that was selected to remain active. A timer for loop retest is also started in step 318. The method 300 then proceeds to step 320 and monitors the state of the active home networking interface chosen from the minimal set of looped interfaces in step 316 and to monitor the expiration of the retest period timer. If the method 300 concludes in step 322 that the active home networking interface selected in step 316 has not failed, and that the loop retest timer has not expired, the method 300 returns to step 320, to continue to monitor the state of the active home networking interface chosen from the minimal set and to monitor the expiration of the retest period timer.

Alternatively, if the method 300 determines in step 322 that the active home networking interface selected in step 316 has failed, or that the loop retest timer has expired, the method 300 proceeds to step 324 and activates the deactivated interfaces before returning to step 304 and re-initiating the loop discovery/mitigation process.

The method 300 thus provides an automated method for mitigating layer-2 loops in hub STBs having multiple home networking interfaces, by substantially ensuring that only one of the home networking interfaces involved in a loop is active at a given time. The method 300 may be implemented, for example, in conjunction hub STBs that have multiple bridged home networking interfaces with some combination of Ethernet, HPAV, MoCA and/or other interfaces (e.g., Institute of Electrical and Electronics Engineers (IEEE) 802.11n standard interfaces). Since network architectures can change at any time, embodiments of the invention contemplate that the method 300 will be implemented to mitigate layer-2 looping on an ongoing basis.

Figure 4:
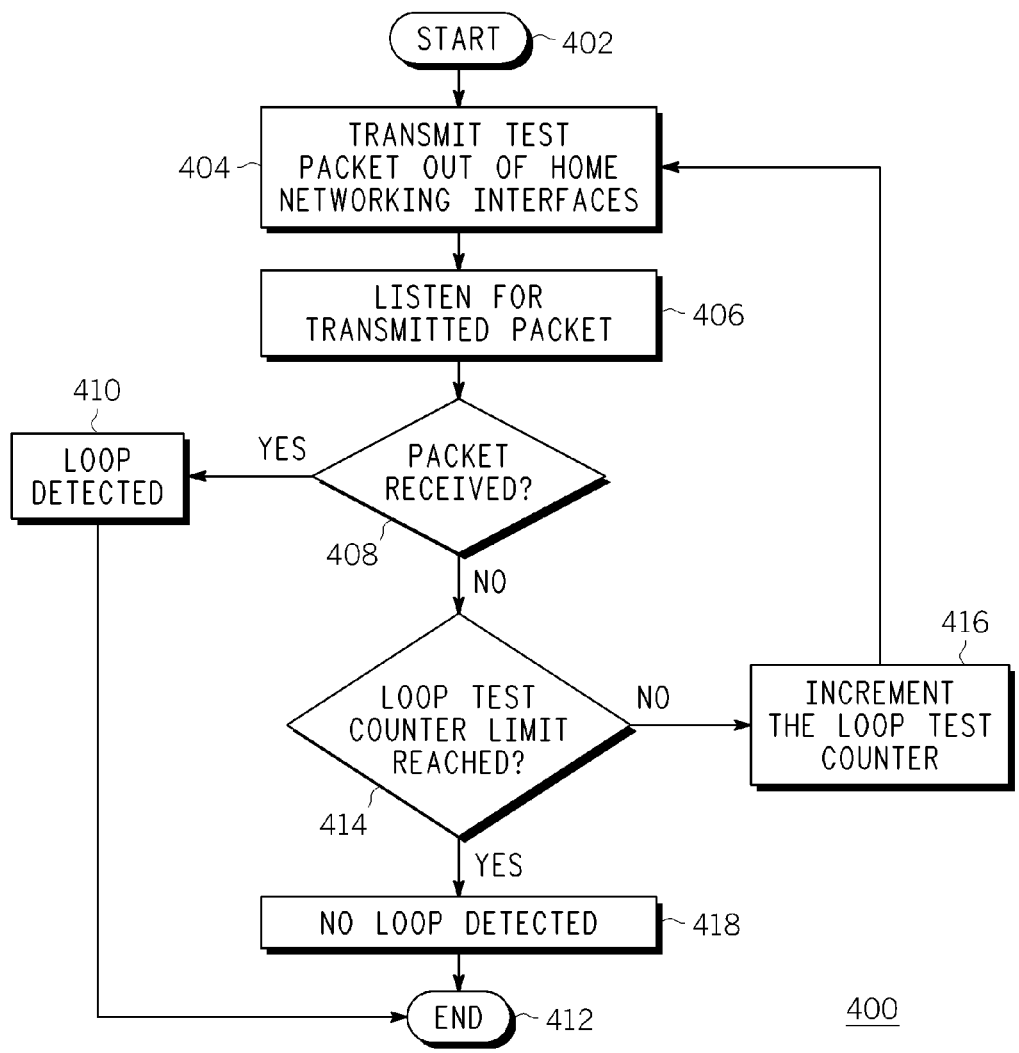
FIG. 4 is a flow diagram illustrating one embodiment of a method for determining whether a layer-2 loop is present in a home network.

FIG. 4 is a flow diagram illustrating one embodiment of a method 400 for determining whether a layer-2 loop is present in a home network. The method 400 may be implemented, for example, in conjunction with step 308 of the method 300.

The method 400 is initialized at step 402 and proceeds to step 404, where the method 400 transmits a packet with a broadcast IP destination address out of the home networking interfaces of the device (e.g., hub) being tested. This is the result of sending a broadcast packet to the device's bridge.

In step 406, the method 400 listens for the transmitted packet. In one embodiment, this involves listening for a unique identification included in the broadcast packet (e.g., in the packet payload). In another embodiment, this involves listening for a private User Datagram Protocol (UDP) port (e.g., within 49152 through 65535).

In step 408, the method 400 determines whether the transmitted packet has been received at its intended destination. If the method 400 concludes in step 408 that the packet was received, then the method 400 determines in step 410 that there is a loop. The method 400 then terminates in step 412.

Alternatively, if the method 400 concludes in step 408 that the transmitted packet was not received, the method 400 proceeds to step 414 and determines whether another packet should be sent. Step 414 involves checking to determine if a configurable loop test counter limit (which sets a threshold for the number of packets that may be sent in accordance with step 414) has been reached. The choice for the loop test counter limit requires a trade-off between the probabilities for loop detection versus delay. A few transmit iterations should be adequate to ensure a high probability of the packet getting back to the hub, despite error conditions and heavy loading from other packet looping.

If the method 400 concludes in step 414 that another packet should be sent, the method 400 proceeds to step 416 and increments the loop test counter. The method 400 then returns to step 404 and proceeds as described above to transmit another packet. Alternatively, if the method 400 concludes in step 414 that another packet should not be sent, the method 400 determines in step 418 that no loop exists. The method 400 then terminates in step 412.

Figure 5:
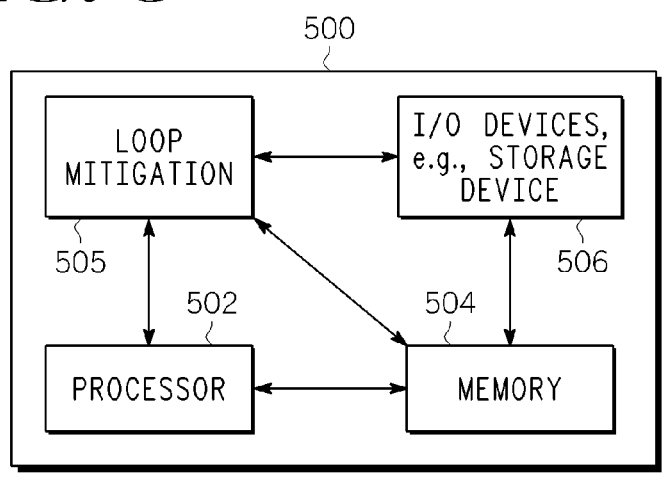
FIG. 5 is a high level block diagram of the present loop mitigation tool that is implemented using a general purpose computing device.

FIG. 5 is a high level block diagram of the present loop mitigation tool that is implemented using a general purpose computing device 500. In one embodiment, a general purpose computing device 500 comprises a processor 502, a memory 504, a loop mitigation module 505 and various input/output (I/O) devices 506 such as a display, a keyboard, a mouse, a modem, a network connection and the like. In one embodiment, at least one I/O device is a storage device (e.g., a disk drive, an optical disk drive, a floppy disk drive). It should be understood that the loop mitigation module 505 can be implemented as a physical device or subsystem that is coupled to a processor through a communication channel.

Alternatively, the loop mitigation module 505 can be represented by one or more software applications (or even a combination of software and hardware, e.g., using Filed-Programmable Gate Array (FPGA)), where the software is loaded from a storage medium (e.g., I/O devices 506) and operated by the processor 502 in the memory 504 of the general purpose computing device 500. Additionally, the software may run in a distributed or partitioned fashion on two or more computing devices similar to the general purpose computing device 500. Thus, in one embodiment, the loop mitigation module 505 for mitigating layer-2 loops in home networking applications described herein with reference to the preceding figures can be stored on a computer readable medium or carrier (e.g., RAM, magnetic or optical drive or diskette, and the like).

Thus, the present invention represents a significant advancement in the field of home networking applications. Embodiments of the invention generally provide a method and apparatus for mitigating layer-2 looping in home networking applications. In one embodiment, an automated method for execution, for example, at a hub STB, substantially ensures that any loops occurring in a home network are detected and eliminated in a timely manner, thereby improving performance of the home network.

While the foregoing is directed to embodiments of the invention, other and further embodiments of the invention may be devised without departing from the basic scope thereof.

What is claimed is:

1. A method for mitigating layer-2 loops in a network having multiple terminals, the method comprising:
    identifying a plurality of active home networking interfaces on a first terminal;
    detecting a loop between a first terminal in the network and a second terminal in the network;
    determining a minimal set of active home networking interfaces at the terminal that are involved in a loop;
    deactivating all but one of the active home networking interfaces in the minimal set,
    wherein the step of deactivating comprises: selecting one active home networking interface in the minimal set to remain active,
    wherein the step of selecting comprises: choosing an active home networking interface from the minimal set that exhibits a highest priority ranking in accordance with one or more preconfigured interface priorities,
    wherein the step of identifying comprises: identifying a total number of active home networking interfaces at the first terminal; transmitting at least one broadcast packet out of each of the identified home networking interfaces from the first terminal; and detecting a loop if a transmitted packet is detected back at the first terminal, and
    wherein the step of determining comprises: testing each pair of active home networking interfaces in a set comprising a total number of active home networking interfaces for the presence of a loop; and including in the minimal set each home networking interface from a pair that tests positive for a loop.

2. The method of claim 1, further comprising:
    retransmitting a packet a number of times, if the packet fails to reach the first terminal.

3. The method of claim 2, wherein the number of times is determined in accordance with a preconfigured test counter limit that sets a threshold for a number of times that the packet is to be retransmitted.

4. The method of claim 1, wherein the one or more preconfigured interface priorities are based on at least one of: capacity, reliability or quality of service.

5. The method of claim 1, wherein the selecting comprises:
    choosing a best performing active home networking interface from the minimal set.

6. A non-transitory computer readable medium containing an executable program for mitigating layer-2 loops in a network having multiple terminals, where the program performs the steps of:

identifying a plurality of active home networking interfaces on a first terminal;

detecting a loop between a first terminal in the network and a second terminal in the network;

determining a minimal set of active home networking interfaces at the terminal that are involved in a loop; and deactivating all but one of the active home networking interfaces in the minimal set, wherein the step of deactivating comprises: selecting one active home networking interface in the minimal set to remain active, wherein the step of selecting comprises: choosing an active home networking interface from the minimal set that exhibits a highest priority ranking in accordance with one or more preconfigured interface priorities, wherein the step of identifying comprises: identifying a total number of active home networking interfaces at the first terminal; transmitting at least one broadcast packet out of each of the identified home networking interfaces from the first terminal; and detecting a loop if a transmitted packet is detected back at the first terminal, and wherein the step of determining comprises: testing each pair of active home networking interfaces in a set comprising a total number of active home networking interfaces for the presence of a loop; and including in the minimal set each home networking interface from a pair that tests positive for a loop.

7. The computer readable medium of claim 6, further comprising:

retransmitting a packet a number of times, if the packet fails to reach the first terminal.

8. The computer readable medium of claim 7, wherein the number of times is determined in accordance with a preconfigured test counter limit that sets a threshold for a number of times that the packet is to be retransmitted.

9. The computer readable medium of claim 6, wherein the selecting comprises:

choosing a best performing active home networking interface from the minimal set.

10. A system for mitigating layer-2 loops in a network having multiple terminals, the system comprising:

means for identifying a plurality of active home networking interfaces on a first terminal;

means for detecting a loop between a first terminal in the network and a second terminal in the network; and means for deactivating at least one active home networking interface at the first terminal, wherein deactivating is performed by determining a minimal set of active home networking interfaces at the terminal that are involved in a loop; deactivating all but one of the active home networking interfaces in the minimal set, wherein the deactivating comprises: selecting one active home networking interface in the minimal set to remain active, wherein the selecting comprises: choosing an active home networking interface from the minimal set that exhibits a highest priority ranking in accordance with one or more preconfigured interface priorities, wherein the identifying comprises: identifying a total number of active home networking interfaces at the first terminal; transmitting at least one broadcast packet out of each of the identified home networking interfaces from the first terminal; and detecting a loop if a transmitted packet is detected back at the first terminal, and wherein the determining comprises: testing each pair of active home networking interfaces in a set comprising a total number of active home networking interfaces for the presence of a loop; and including in the minimal set each home networking interface from a pair that tests positive for a loop.

11. The system of claim 10, wherein a broadcast packet is retransmitted a number of times, if the packet fails to reach the first terminal.

12. The system of claim 11, wherein the number of times is determined in accordance with a preconfigured test counter limit that sets a threshold for a number of times that the packet is to be retransmitted.

13. The system of claim 10, wherein the one or more preconfigured interface priorities are based on at least one of: capacity, reliability or quality of service.

14. The system of claim 10, wherein the selecting comprises: choosing a best performing active home networking interface from the minimal set.

* * * * *